US011562442B2

(12) United States Patent
Smith et al.

(10) Patent No.: US 11,562,442 B2
(45) Date of Patent: Jan. 24, 2023

(54) SOCIAL GRAPH DATABASE WITH COMPOUND CONNECTIONS

(71) Applicant: Graphite Systems Inc., Sandy, UT (US)

(72) Inventors: Conrad Smith, Sandy, UT (US); Aaron Oyler, Provo, UT (US); Michael Nelson, Lehi, UT (US); Laura Florence, Salt Lake City, UT (US); David Ozenne, West Jordan, UT (US); Clark Theodore Endrizzi, Sandy, UT (US); Daniel Wilson, Saratoga Springs, UT (US)

(73) Assignee: Graphite Systems Inc., Sandy, UT (US)

( * ) Notice: Subject to any disclaimer, the term of this patent is extended or adjusted under 35 U.S.C. 154(b) by 328 days.

(21) Appl. No.: 16/803,325

(22) Filed: Feb. 27, 2020

(65) Prior Publication Data
US 2020/0279337 A1 Sep. 3, 2020

Related U.S. Application Data

(60) Provisional application No. 62/812,582, filed on Mar. 1, 2019.

(51) Int. Cl.
G06F 15/16 (2006.01)
G06Q 50/00 (2012.01)
G06Q 10/10 (2012.01)
G06F 16/9538 (2019.01)
H04L 9/40 (2022.01)
(Continued)

(52) U.S. Cl.
CPC ......... *G06Q 50/01* (2013.01); *G06F 16/9024* (2019.01); *G06F 16/9536* (2019.01); *G06F 16/9538* (2019.01); *G06Q 10/105* (2013.01); *H04L 63/102* (2013.01)

(58) Field of Classification Search
CPC .... G06Q 50/01; G06F 16/9024; H04L 63/102
See application file for complete search history.

(56) References Cited

U.S. PATENT DOCUMENTS 8,307,427 B1 * 11/2012 Wisilosky ............... G06F 21/16
713/193
8,539,359 B2 9/2013 Rapaport et al.
(Continued)

FOREIGN PATENT DOCUMENTS

WO 2015019186 2/2015
WO WO-2020180615 A1 9/2020

OTHER PUBLICATIONS

"International Application Serial No. PCT US2020 020136, International Preliminary Report on Patentability dated Sep. 16, 2021", 10 pgs.
(Continued)

*Primary Examiner* — Hieu T Hoang
(74) *Attorney, Agent, or Firm* — Schwegman Lundberg & Woessner, P.A.

(57) ABSTRACT

A compound social network site can manage complex organizational entities, such as businesses, via a compound social network graph. Nodes of the compound social network graph are connected by compound edges which correspond to multiple tiers of profile data of the organizational entities.

22 Claims, 22 Drawing Sheets

(51) Int. Cl.
*G06F 16/9536* (2019.01)
*G06F 16/901* (2019.01)

(56) References Cited

U.S. PATENT DOCUMENTS

| | | | | |
|---|---|---|---|---|
| 8,825,962 B1* | 9/2014 | Zhu | ........................ | H04L 67/535 |
| | | | | 711/E12.002 |
| 9,392,314 B1* | 7/2016 | Lewis | ................. | H04N 21/2408 |
| 9,442,467 B1* | 9/2016 | Behbehani | ............. | G06Q 50/01 |
| 10,511,603 B2* | 12/2019 | Matsumoto | ............. | H04L 63/10 |
| 2006/0155578 A1* | 7/2006 | Eisenberger | ............... | H04L 9/40 |
| | | | | 707/999.009 |
| 2009/0113006 A1* | 4/2009 | McWana | ................. | H04L 67/02 |
| | | | | 715/846 |
| 2009/0265242 A1* | 10/2009 | Horvitz | ................. | H04L 67/306 |
| | | | | 726/26 |
| 2011/0219310 A1* | 9/2011 | Robson | .................. | G06Q 30/02 |
| | | | | 715/733 |
| 2011/0252121 A1* | 10/2011 | Borgs | .................. | G06Q 10/10 |
| | | | | 709/223 |
| 2011/0314482 A1* | 12/2011 | Cupala | ................. | H04L 67/535 |
| | | | | 719/328 |
| 2012/0042392 A1* | 2/2012 | Wu | ........................ | H04L 63/102 |
| | | | | 726/28 |
| 2013/0198811 A1* | 8/2013 | Yu | ........................... | H04L 63/08 |
| | | | | 726/4 |
| 2013/0254215 A1* | 9/2013 | Davar | ................. | G06F 16/9535 |
| | | | | 709/204 |
| 2013/0347078 A1* | 12/2013 | Agarwal | ................. | H04L 63/00 |
| | | | | 709/204 |
| 2014/0081844 A1* | 3/2014 | Hosp | ................... | G06Q 20/4015 |
| | | | | 705/39 |
| 2014/0136528 A1* | 5/2014 | Anima | ................... | G06F 16/951 |
| | | | | 707/723 |
| 2014/0310355 A1* | 10/2014 | Work | ................. | G06Q 10/1053 |
| | | | | 709/204 |
| 2015/0309986 A1* | 10/2015 | Brav | ...................... | G06F 16/38 |
| | | | | 707/739 |
| 2016/0241532 A1* | 8/2016 | Loughlin-Mchugh | ...................... | |
| | | | | H04W 12/06 |
| 2016/0277538 A1* | 9/2016 | Chow | ..................... | H04L 67/75 |
| 2016/0335599 A1* | 11/2016 | Kawanabe | ........... | G06Q 10/109 |
| 2017/0199920 A1* | 7/2017 | Pearson | ................ | H04L 67/306 |
| 2017/0337602 A1* | 11/2017 | Davis | ................... | G06V 40/174 |
| 2018/0109537 A1* | 4/2018 | Schmidt | ................. | G06Q 50/01 |

OTHER PUBLICATIONS

"International Application Serial No. PCT US2020 020136, International Search Report dated Jun. 5, 2020", 2 pgs.
"International Application Serial No. PCT US2020 020136, Written Opinion dated Jun. 5, 2020", 8 pgs.
"European Application Serial No. 20766039.0, Extended European Search Report dated Mar. 3, 2022", 8 pgs.

* cited by examiner

905

^ Code of Conduct

Is your company committed to conduct business with ethics and integrity?
- Yes

Does your company have a Director of Compliance, or equivelent, to oversee, review and approve business compliance and ethics strategy and practes within the company?
- Not Answered Does your company have a Code of Conduct?
- No
  - Please clarify your answer
    working on it Does your company requiere new employees to review or sing a Code of Conduct?
- Yes Does your company requiere period training or review of the code of conduct?
- Yes Does your company have a process in place to handle code of conduct violations?
- Not Answered Does your company require new employees to sign a non-dislosure agreement?
- Yes Does your company have a third party(e.g.Suppliers, Partners) Code of Conduct?
- No
  - Please clarify your answer
    working on it

*FIG. 9B*

Products and services
List the names of the products of services that you sell

[Survey software]

Company keywords

New Supplier Justification

🌐 FOR INTERNAL ONLY          Cancel  [Save]

Are you the company relationship owner for   XYZ BIZ  ?
  ⦿Yes ○No
Is XYZ BIZ   an existing supplier that is already providing goods or services to?
  ○Yes ⦿No
  When will   XYZ BIZ   start providing goods or services to?

How will your company make payments to   XYZ BIZ  ?

Is this one-time business engagement?
  ○Yes ○No

Cancel  [Save]

Messages

| Company Overview | Products and Services | Compliance |

Compliance Profile Builder

Is your company committed to conduct business with ethics and integrity?
● Yes  ○ No Number of Employees
1

Does your company access, collect, process, store, host or retain client data of any sort?
● Yes  ○ No Does your company own or lease physical offices, data centers or facilities where work is done and/or company assets, data, materials, products or intellectual property are stored or secured?
○ Yes  ● No Does your company have a program or policy relating to Environmental Sustainability?
○ Yes  ● No Is your company required by law to report conflict minerals based on the product you manufacture?
○ Yes  ● No Filter ▼

Cancel  [Save]

Ethics and Integrity ▶

Data Privacy ▶

Messages

SOCIAL GRAPH DATABASE WITH COMPOUND CONNECTIONS

PRIORITY APPLICATIONS

This application claims the benefit of priority to U.S. Provisional Application Ser. No. 62/812,582, filed Mar. 1, 2019, the content of which is incorporated herein by reference in its entirety.

TECHNICAL FIELD

The present disclosure generally relates to machines configured to the technical field of special-purpose machines that manage electronic communications over a network and improvements to such variants, and to the technologies by which such special-purpose machines become improved compared to other special-purpose machines for implementing a social graph database utilized by a network site.

BACKGROUND

Social network sites allow users to connect and share information, such as images, status updates, and profile data. The type of data managed by such social network websites and the connections made between users is often elementary in nature: users can connect, and after being connected, they can view and interact with each other's data. Current social network sites do not address the needs of large global organizations sharing critical risk, contact, payment, and tax data items with other complex multi-country, multi-user, multi-product organizations having varying organizational hierarchies and supply chains that span the globe.

BRIEF DESCRIPTION OF THE DRAWINGS

Various ones of the appended drawings merely illustrate example embodiments of the present disclosure and should not be considered as limiting its scope.

FIGS. 9A-9F show example user interfaces for generating a compound edge in a social graph database, according to some example embodiments.

FIGS. 10A and 10B show an example user interface for updates and performing actions in response to the updates, according to some example embodiments.

DETAILED DESCRIPTION

Figure 1:
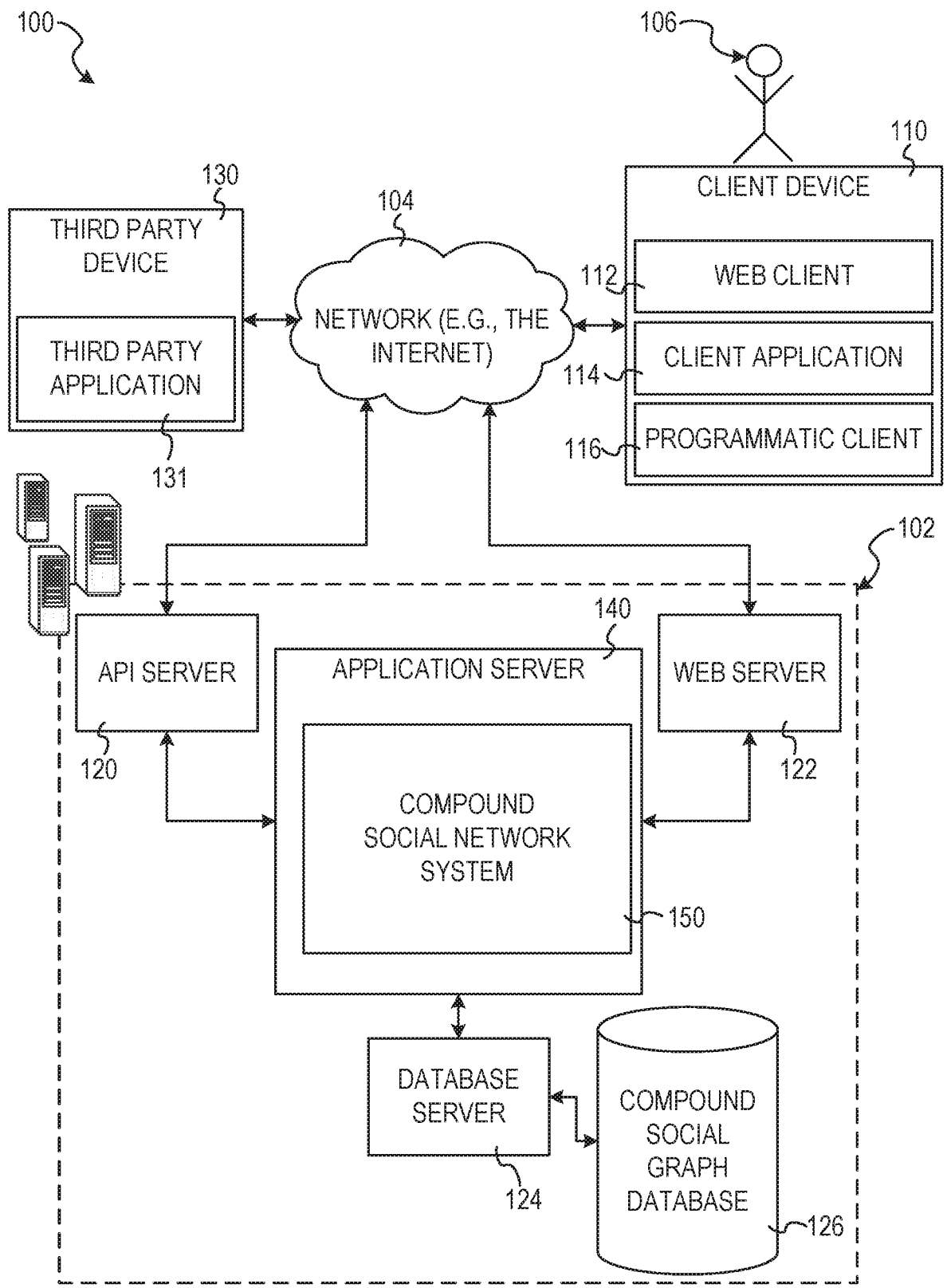
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, current social network sites are ill suited for use by complex entities, such as large multi-national businesses. This is due at least in part because business entities have complex internal structures that govern a given entity's employee management policies, business transactions, confidentiality and security measures, tax policies, and legal policies according to one or more legal requirements in different countries and current best business practices. Due to these requirements, complex entities avoid use of social networks for business interactions between one another, and instead use existing social networks as marketing or public relations tools. For example, whereas an American large company may use a conventional social network to post about a new product launch, the American large company would clearly not use a conventional social network to establish a business connection and share sensitive data with a large foreign corporation (e.g., supplier) and vice versa.

To this end, a compound social network platform can be implemented to manage a social graph database to maintain complex connections between complex organizational entities, such as businesses. The social graph database consists of nodes, where each node corresponds to an entity account profile of a business entity. As used here, connections between nodes are implemented as compound relations that consist of a plurality of network interaction stages as part of a graduated connection process. When one complex entity seeks to connect to another entity on the compound social network platform, different portions of the data are sequentially exposed sets to the connecting entities based on which stage of the graduated connection process is the current stage. In some example embodiments, the stages comprise an initial stage in which an initial data set is exposed, an elevated stage in which an elevated data set is exposed, and a trusted stage in which trusted data is exposed to the connecting entities. Upon completion of the graduated connection process, a compound edge is generated in a compound social graph database to connect the nodes of the entities. The compound edge comprises multiple relationships, any of which can be modified upon subsequent update to either of the connected entities' profile data. For example, if a company erases its tax status information from its profile data, one or more companies connected to the company will automatically be notified (e.g., a notification that one of the compound relations of a connected edge is now invalid), and in some example embodiments, the compound social network platform automatically performs further network actions, such as modifying which data of the connected companies is viewable by the company that changed its tax status information. In this way, complex entities can safely interact with one another over a compound social network site, where levels of data and access can be controlled and updates to node connections are automatically managed such that data between nodes is controlled in a secure manner for the duration of the entity connections.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), client applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), minicomputer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a World-wide interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the client application 114 include various components operable to present information to the user and communicate with networked system 102.

The web client 112 accesses the various systems of the networked system 102 via the web interface supported by a web server 122. Similarly, the programmatic client 116 and client application 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server 140. The application server 140 can host a compound social network system 150, which can comprise one or more modules or applications and each of which can be embodied as hardware, software, firmware, or any combination thereof. The application server 140 is, in turn, shown to be coupled to a database server 124 that facilitates access to one or more information storage repositories, such as compound social graph database 126. In an example embodiment, compound social network system 150 manages compound connections between entity users via connections managed and metadata stored via the compound social graph database 126. Additionally, a third-party application 131, executing on third-party server 130, is shown as having programmatic access to the networked system 102 via the programmatic interface provided by the API server 120. For example, the third-party application 131, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. In particular, and according to example embodiments, the compound social network system 150 is implemented as a blockchain network protocol in which a plurality of nodes record changes to graduated connection process data and profile data of users in a consensus fraud proof architecture. The various systems of the applications server 140 (e.g., the compound social network system 150)

can also be implemented as standalone software programs, which do not necessarily have networking capabilities.

Figure 2A:
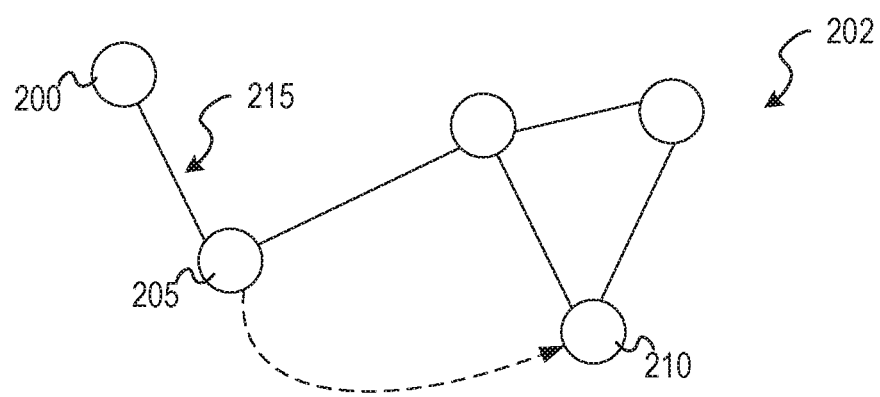
FIG. 2A shows a compound social graph database of a compound social network, according to some example embodiments.

FIG. 2A shows a compound social graph database 202 of a compound social network, according to some example embodiments. As illustrated, the compound social graph database 202 comprises a plurality of nodes (e.g., node 200 denoted by a circle) that are connected by edges (denoted by solid lines). Each node is an organization node of an organization entity (e.g., business, organization) having a network platform account of the compound social network system 150, according to some example embodiments. In the illustrative example, the edges of the compound social graph database 202 are compound edges (e.g., compound edge 215) that consist of multiple data relationships between a given pair of connected nodes. In FIG. 2A, the organization nodes include a first node 205 and a second node 210, where the first node 205 has invited a second node 210 to connect on the compound social graph database 202 as denoted by the dotted arrow extending from the first node 205 to the second node 210.

Figure 2B:
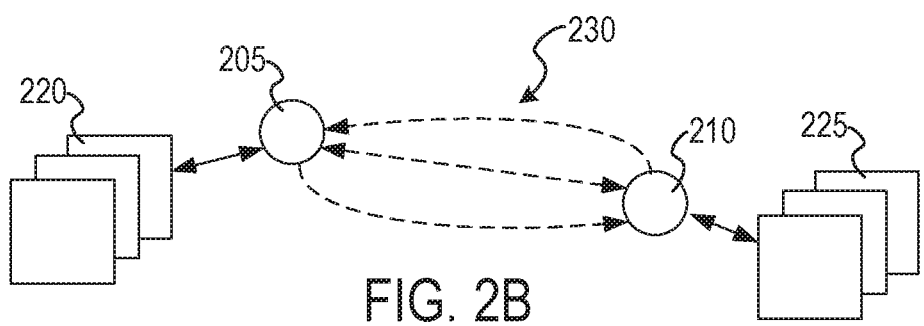
FIG. 2B shows a plurality of graduated network interactions that occur to create a compound edge between a first node and a second node, according to some example embodiments.

FIG. 2B shows a plurality of graduated network interactions 230 that occur to create a compound edge between the first node 205 and the second node 210, according to some example embodiments. In FIG. 2B, the first node 205 has input answers in response to questions to create a first graduated data set 220 for the compound social network system 150. For example, a user of the entity corresponding to the first node 205 has completed parameter form fields of the first graduated data set 220 on a client device, such as client device 110. The first graduated data set 220 is then stored by the compound social network system 150 on the compound social graph database 126 via database server 124.

Figure 2C:
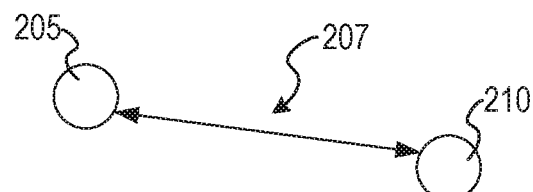
FIG. 2C shows a new compound connection, according to some example embodiments.

Likewise, the second node 210 has input answers in response to questions to a second graduated dataset 225 to be managed by the compound social network system 150. The second graduated dataset 225 is then stored in the compound social graph database 126 via database server 124, according to some example embodiments. The graduated data sets are graduated in that specified portions of the datasets are made available or otherwise accessible to the nodes based on which of the plurality of graduated network interactions 230 is being performed by the compound social network system 150. Upon the plurality of graduated network interactions 230 being sequentially exposed and approved, the first and second nodes are connected by a new compound edge 207, as illustrated in FIG. 2C.

In some example embodiments, nodes inherit data from parent nodes that is automatically used in a graduated connection process to simplify and expedite connections between two organizationally complex entities. For example, a large conglomerate corporation can correspond to a parent node and subsidiaries of the large conglomerate corporation correspond to child nodes of the parent node that inherit profile data (e.g., graduated connection data) for use in creating compound connections with external organizations (e.g., nodes of external organizations in the compound social network).

Figure 3:
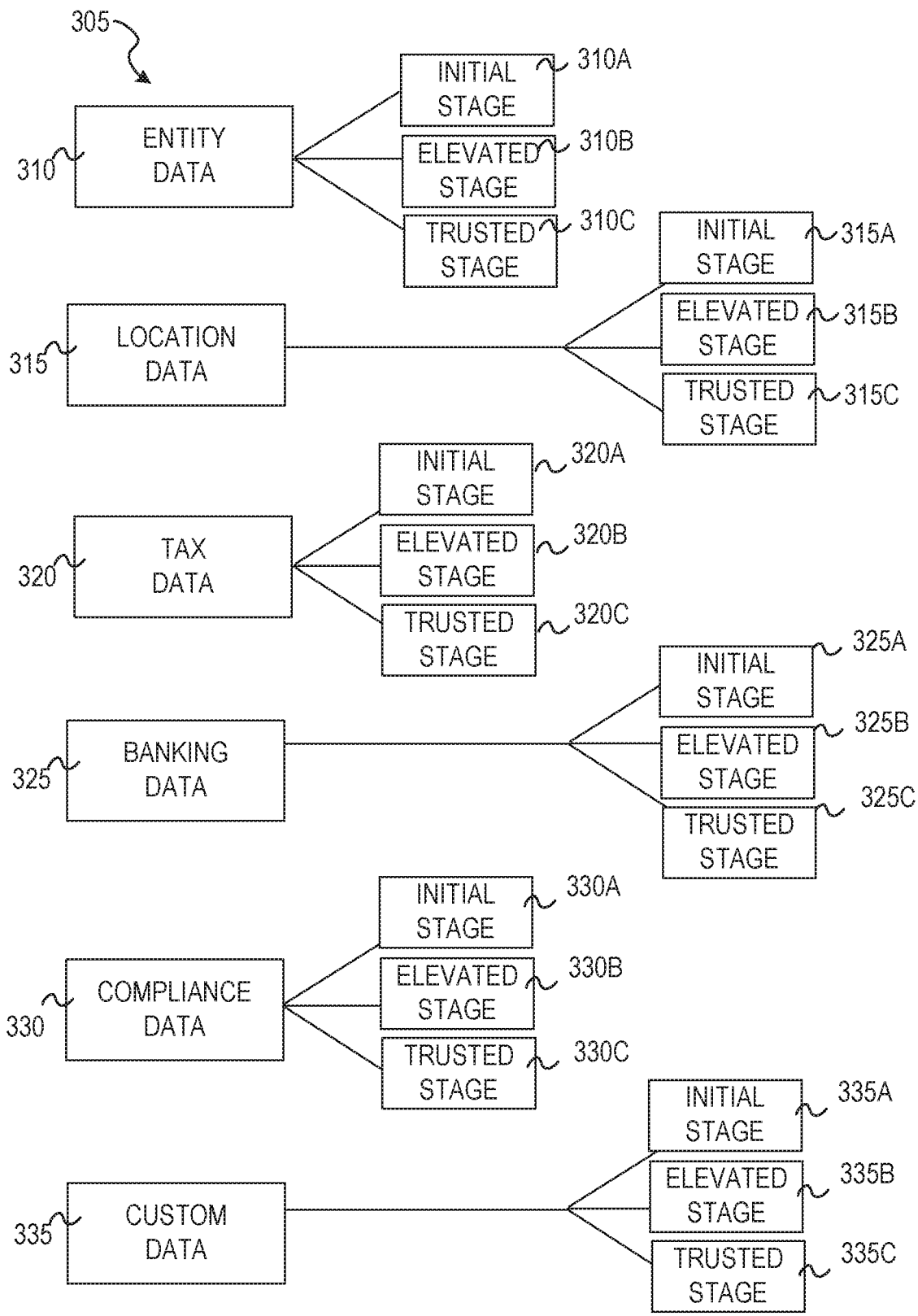
FIG. 3 shows a structured data architecture for graduated data sets, according to some example embodiments.
Figure 7:
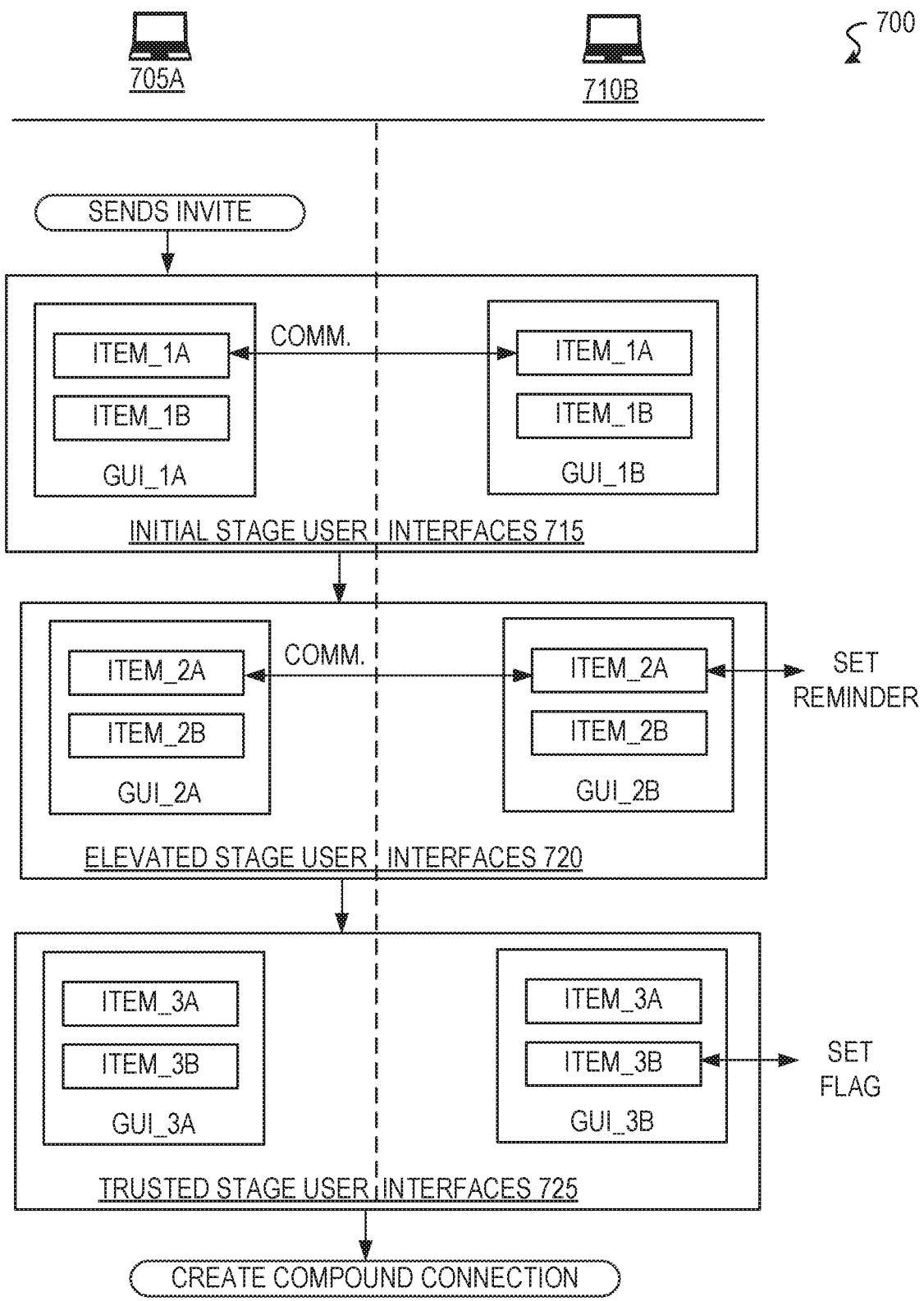
FIG. 7 shows an example network interaction diagram for two users connecting on the compound social network platform, according to some example embodiments.

FIG. 3 shows a structured data architecture 305 for graduated data sets, according to some example embodiments. The structured data architecture 305 can be implemented to structure graduated data received from client devices (e.g., input through client devices by users of a complex entity, such as a business entity) and selectively expose portions of the stored graduated data in a compound connection process (FIG. 2B, and FIG. 7 discussed below). As illustrated, the structured data architecture 305 comprises different example datatypes such as entity data 310, location data 315, tax data 320, banking data 325, compliance data 330, and custom data 335. Although six datatypes are displayed, it is appreciated that additional datatypes can be included in structured data architecture per implementation of a compound social network in different network environments.

In the example illustrated, the entity data 310 is a categorization for questions and/or answers that describe the user entity, such as a business description entity logo, entity name, entity industry, entity website, entity short description, entity long description, entity primary language, entity year creation, entity employee count, entity stock symbol, and so on. The location data 315 is a categorization for questions and/or answers that describe the user entity's location, such as address name, address country, address region or state, address city, complete address, address type, address postal code, and so on. The tax data 320 is a categorization for questions and/or answers that describe the entity's tax information, which may be complex from a data structures standpoint due to different countries using differently formatted tax data fields; and documentation requirements. Similarly, banking data 325 is a categorization for questions and answers that describe payment data of an entity (e.g., bank account number, bank name, bank region, bank city, routing number, currency). Similarly, compliance data 330 is a categorization for questions and answers that describe users' compliance data with different laws of one or more countries (e.g., European Union. Privacy Law, GPDR) or protocols for a given company (e.g., codes of conduct). The custom data 335 is a data categorization for questions and answers that are manually created by the given user entity to be included in the graduated connection process of a compound social network system.

For example, in addition to the location, tax, and compliance structures, the entity may desire that specific questions regarding a company's carbon footprint be included in the graduated process to ensure that the user entity is connecting with an environmentally conscious company (e.g., node) on the compound social network platform. In some example embodiments, the custom data 335 for a given node (e.g., an organizations' custom data fields, or custom data fields requested by an organization and stored by the organization for audit purposes) is not externally available to public networks (e.g., the Internet) or other nodes on the compound social network platform. For example, the custom data 335 can be used internally by an organization for statutory audits, investigations, and record keeping operations.

In this way, instead of merely connecting nodes, the compound social network system 150 stores internally used data that is used to create node connections in such as way that the connection data can later be referenced and analyzed. That is, for example, in filling out the data for the graduated data set, some of the data can be used in the graduated relationship process to create the new connection, and other portions of the graduated data set are internally held for record keeping, where the process of completing the data for the graduated data set creates both types of data at the same time, thereby ensuring the connections are made and the internal records can be audited later if an issue arises (e.g., legal/compliance issue of a given entity or a legal/compliance issue of another entity to which the given entity is compound-connected).

According to some example embodiments, each of the datatypes in the structured data architecture 305 corresponds to a different question type and data answer field that can be assigned to an initial stage of connecting two entity users on the compound social network: an elevated stage of connecting two entity users on the compound social network and a trusted stage of connecting entity users on the compound social network. For example, entity data 310 comprises different questions and answers that can be exposed or made accessible to potential connections in an initial stage 310A, an elevated stage 310B, and a trusted stage 310C, as discussed in further detail below.

Figure 4:
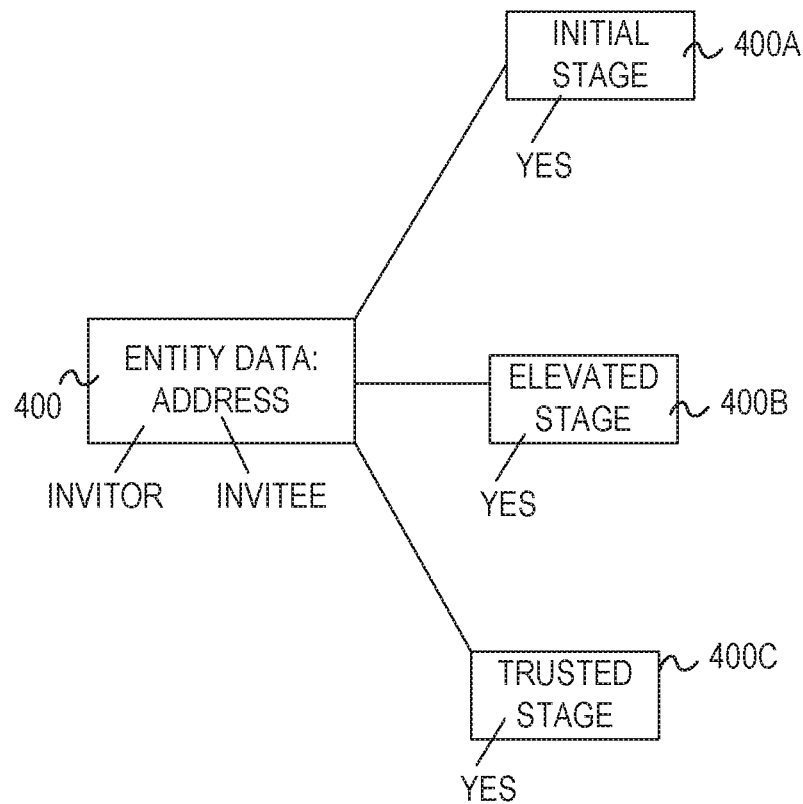
FIG. 4 shows an example parameter of a graduated data set, according to some example embodiments.

FIG. 4 shows an example entity parameter data 400 (e.g., question-answer paired data) of a graduated data set, according to some example embodiments. As used herein, parameter comprises a specific question (e.g., address) and the answer data to the specific question (e.g., "123 Filmore St.,"). In the example of FIG. 4, the entity parameter data 400 is for an address of a user entity. The entity parameter data 400 can be tagged as being a question to be answered for an invitor (e.g., first node 205 in FIG. 2A) or an invitee (e.g., the second node 210 in FIG. 2A), as part of a graduated connection process in a compound social network. As illustrated, the entity parameter data 400 is to be exposed or made accessible to connecting users in the initial stage 400A, the elevated stage 400B, and the trusted stage 400C as denoted by the "YES" metadata tags. For example, the entity parameter data 400 may be an address of an invitor entity that is displayed on the invitor's profile page of the compound social network system 150 (e.g., a network website thereof) and viewable by any user on the network 104 (e.g., users that are logged-in but not connected to the invitor entity, users that are not logged-in and anonymously browsing the social network site of the compound social network system 150 via web server 122, and so on).

Figure 5:
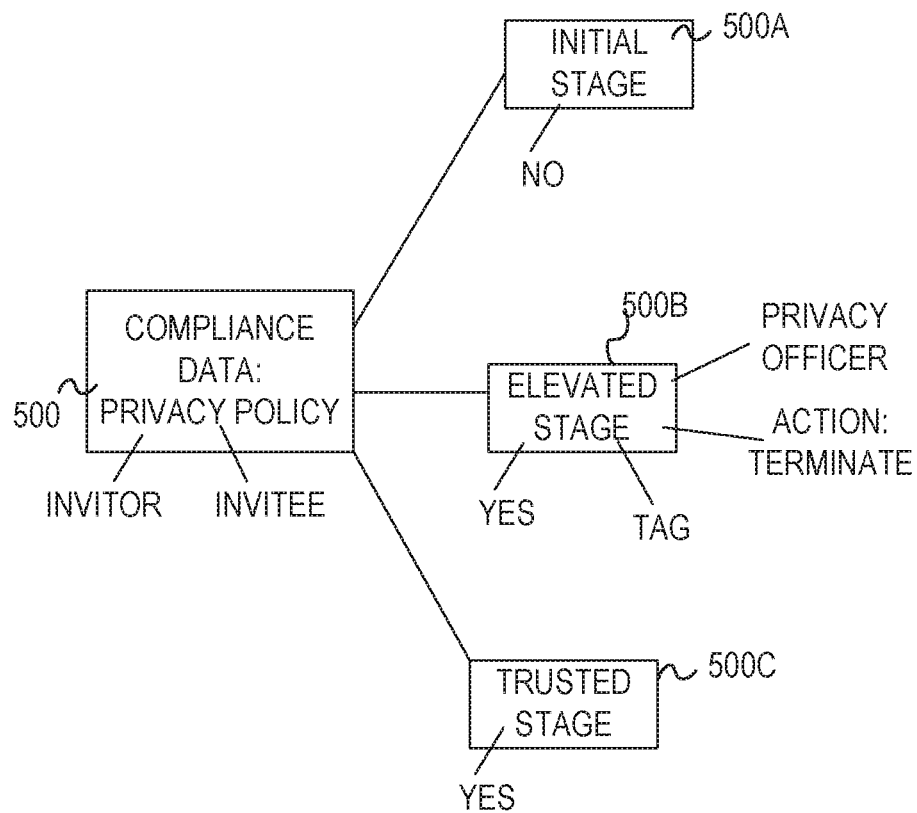
FIG. 5 shows an example compliance parameter of a graduated data set, according to some example embodiments.

FIG. 5 shows an example entity compliance parameter 500 of a graduated data set, according to some example embodiments. In the example of FIG. 5, the entity compliance parameter 500 describes the privacy policy of an entity user, such as invitor or invitee. As illustrated, the compliance parameter 500 may be made accessible to a potential connecting user in the elevated stage 500B and trusted stage 500C but not in the initial stage 500A. For example, the first node 205 may send an invite to the second node 210 thereby initiating the initial stage 500A. Upon the initial stage 500A being approved by the first node 205 and the second node 210, the elevated stage 500B is initiated in which the entity compliance parameter 500 is viewable by the entities of the corresponding first and second nodes 205, 210. As illustrated, in some example embodiments, the parameters of the graduated data set have further metadata values including tags (e.g., "TAG" in FIG. 5) or specified values. For example, in the elevated stage 500B, the privacy officer data field is declared (e.g., an electronic message address for a company's privacy offer). The specified values can be communication portals that connect to the user specified (e.g., a chat window that opens a session to the privacy officer, when the privacy officer logs into his/her account on the compound social network platform). The tags can be used for customizable actions such as highlighting a given field with a user interface color when displayed on a user interface. As an additional example, the elevated stage 500B has an action of termination (e.g., "TERMINATE") which will terminate the connection at the elevated stage, and reduce access between the connected entities to data below the given stage (e.g., after termination, only the initial stage data is accessible to both entities). The terminate action can be specified, for example, if one entity changes their compliance data to indicate they do not have a data privacy certification, do not have an operating income of a certain amount, or other conditions.

In some example embodiments, the tagged users of a given stage are the only end-user of the given complex entity that can approve the elevated stage. For example, any sales person of a given company may approve the compound connection of the initial stage 500A (e.g., approve the location data to connect to a potential business supplier or connection), while at the elevated level of elevated stage 500B, only the tagged privacy office has authorization on the compound social network system 150 to approve the graduated connection process (e.g., connect the two entities if the elevated stage 500B is the last stage, or continue on to further stages for further data types to be exposed and further approvals granted).

Figure 6:
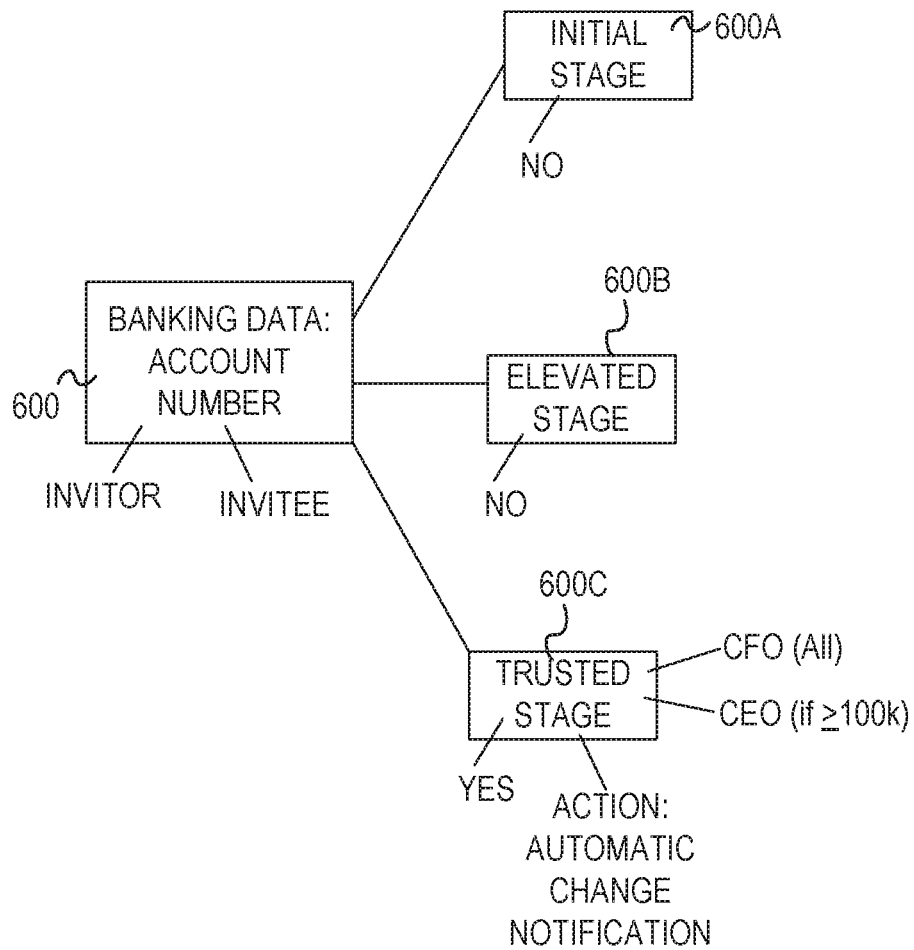
FIG. 6 shows an example banking data parameter of a graduated dataset, according to some example embodiments.

FIG. 6 shows an example entity banking parameter data 600 of a graduated dataset, according to some example embodiments. In the example of FIG. 6, the banking data (e.g., an account number) is only displayed in the trusted stage 600C, and only after the initial stage 600A and the elevated stage 600B are completed in the graduated connection process (e.g., approved by each of the first node 205 and the second node 210, by tagged user types in the respective entities). In some example embodiments, the trusted stage 600C can be associated with preconfigured actions, such as a termination action or notification action, if any of the data associated with approval of the trusted stage 600C is modified or deleted after the compound connection is made.

In the example illustrated, two users of the entity can approve the trusted stage 600C, the chief finance officer (CFO) and the chief executive officer (CEO). For example, the CEO has an assigned role of a user account into which the CEO logs in (e.g., username/password login) to create an active session for the CEO's user account in the corresponding organization of the CEO, and the CFO has a CFO assigned rule and user account. In some example embodiments, the tagged approved roles have integrated logic conditions that only require approval of a given role if the data values satisfy a preconfigured rule. For example, at the trusted stage 600C, the CFO is notified for any connection process that reaches that stage for his/her approval to share data of that stage (e.g., banking account data); while the CEO is only notified and his/her approval requested for that stage if the currency amount is higher than a prespecified amount. For example, the CEO is notified if the compound connection is being created to connect to a supplier for over 100,000 dollars worth of supplies or materials; or the CEO is notified at the trusted stage if a compound connection is being created to another company that has an annual revenue of over 10 dollars. In this way, compound connections can be created efficiently on the compound social graph in a way that safeguards business relations between the entities and does not burden officers of the organization with connection approval requests. For example, if a connection is being created to acquire janitorial supplies for a company for a smaller purchase order, the higher company officers need not approve it at the trusted stage, but if important companies are being contacted (e.g., companies the CEO is aware of and attempting to build a relationship with), then individuals lower in the organizational hierarchy would still need CEO approval (or another specified role) to complete the trusted stage of the compound relationship.

In some example embodiments, individuals of an organization have user accounts with preconfigured authorization to expose some or all of the graduated dataset with another company, thereby bypassing or otherwise auto-approving one or more stages of the compound edge connecting process in the compound social network. For example, if the CEO associated with the trusted stage 600C is the one that reaches out to make a connection with another person in another organization, the CEO via his user account settings (e.g., of a logged-in user session) can connect and automatically expose information of the graduated dataset that would otherwise only be exposed in the initial state and the elevated stage. In contract, a sales person of that same company can only use his/her user account to create connections with other entity nodes through a default compound connection process that uses the multiple stages, e.g., initial stage, elevated stage; and a trusted or final stage. In this way, multiple user accounts of a given entity (e.g., a first company) have access to connect with other entities (e.g., another second company) in different compound edge connection processes.

FIG. 7 shows an example network interaction diagram 700 for two entity users connecting on the compound social network system 150, according to some example embodiments. At a high level, the graduated dataset of each user is exposed to the other user in stages, including initial stage user interfaces 715, elevated stage user interfaces 720, and trusted stage user interfaces 725. As illustrated, after the first user's client device 705A sends an invite to a second user of client device 710B, the initial stage user interfaces 715 are displayed on respective client devices 705A and 710B. In the example of FIG. 7, items ending in "A" are graduated data set values (e.g., answers) input by client device 705A, and items ending in "B" are graduated data set values (e.g., answers) input by the client device 710B. For example, "ITEM_1A" may be the physical address of the first user of client device 705A, and "ITEM_1B" may be the physical address of the second user of client device 710B, where physical address is tagged for display in the initial stage (as discussed in FIG. 4, above).

Upon receiving approval from client devices 705A and 710B after viewing the initial stage user interfaces, the graduated connection process proceeds to a second stage in which the elevated stage user interfaces 720 are displayed on respective client devices 705A and 710B. For example, "ITEM_2A" may be the compliance data of the user entity of client device 705A, and "ITEM_2B" may be the compliance data of the second user entity of client device 710B, where compliance data is tagged for display in the elevated stage but not in the initial stage (as discussed in FIG. 5, above).

Upon receiving approval from client devices 705A and 710B after viewing the elevated stage user interfaces 720, the graduated connection process proceeds to a third stage in which the trusted stage user interfaces 725 are displayed on respective client devices 705A and 710B. For example, "ITEM_3A" may be the bank account information of the first user of client device 705A, and "ITEM_3B" may be the bank account information of the second user entity of client device 710B, where banking data is tagged for display in the trusted stage but not in the initial or elevated stages (as discussed in FIG. 6, above).

Upon receiving approval from the client devices 705A and 710B in the trusted stage, the compound social network system 150 then proceeds to create a compound connection between two nodes of the client devices 705A and 710B in the compound social network graph, as discussed above. Further depicted in FIG. 7 are electronic communication sessions that are assigned to individual data items, as denoted by the double-side arrows connecting items (e.g., "COMM."), as discussed in further detail below with reference to FIG. 9E below. Further, according to some example embodiments, either of the client devices 705A and 710B can further perform interactions, such as setting reminders for the compound social network system 150 to re-evaluate the tagged item, or flag a given item for further analysis (e.g., analysis by a Human Resources manager).

Figure 8A:
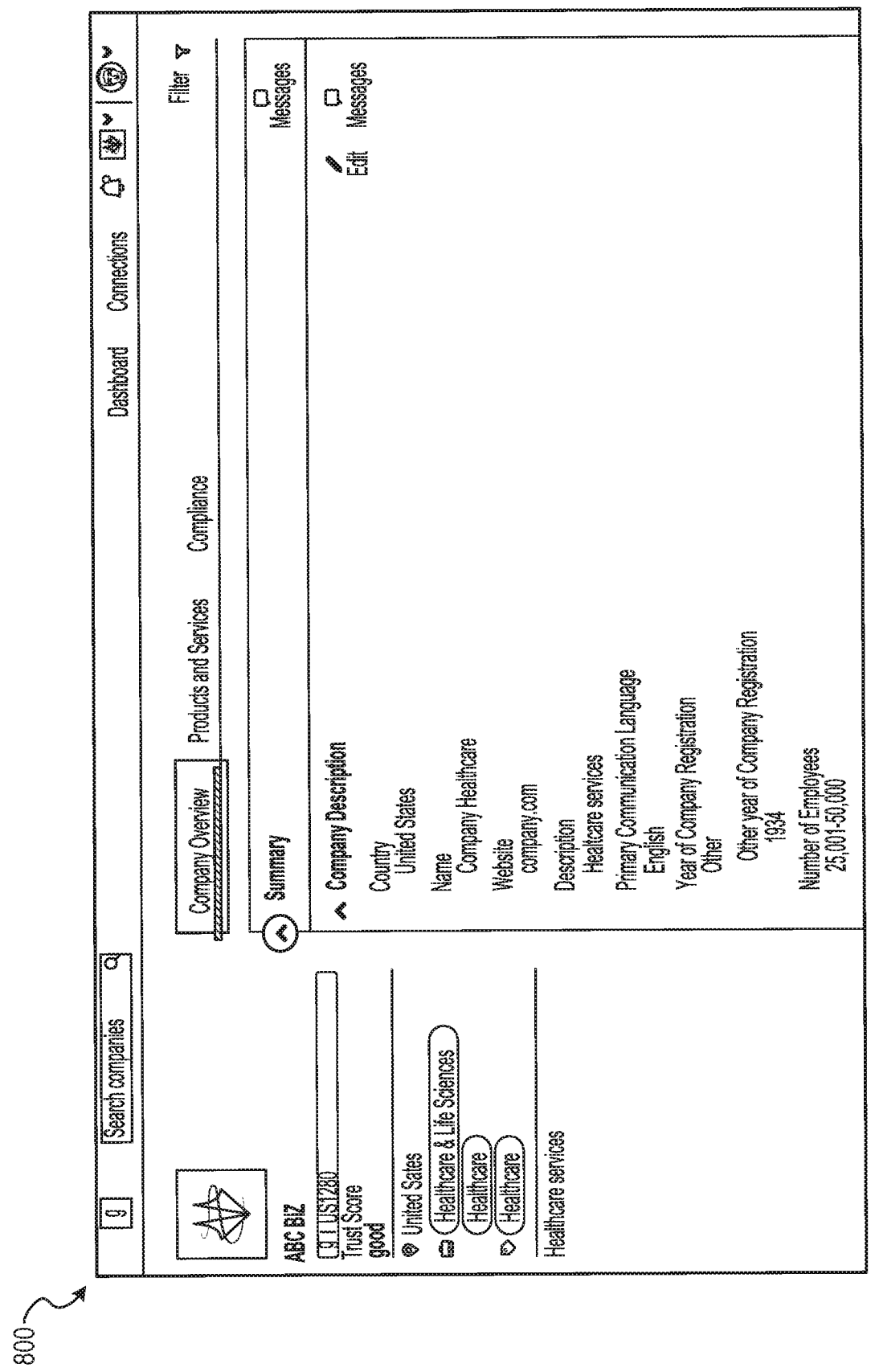
FIGS. 8A-8C show example user interfaces for inputting data, according to some example embodiments.
Figure 8B:
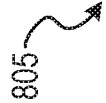

FIG. 8A shows an example user interface 800 for editing entity profile data of a graduated dataset, according to some example embodiments. FIG. 8B shows a dynamic user interface 805 that populates questions based on answers input into the dynamic user interface 805. For example, if the number of employees changes from "0" to "1", the "Ethics and Integrity" set of questions may dynamically be included in dynamic user interface 805. In some example embodiments, the questions are designated for inclusion in the user interface by the candidate connecting users. For example, an invitor (e.g., inviting user) user can send a request to connect (e.g., create a compound connection) to an invitee recipient user, where the invitee user specifies the question parameter fields to be completed by the invitor user and vice versa, for two or more of the initial, elevated, or final portions of the graduated datasets. In some example embodiments, the individual parameter fields (e.g., questions and corresponding answers) of connecting nodes are identical, and each user completes answers for the same set of questions for inclusion in a given stage. In other example embodiments, the individual parameter fields in a given stage are not identical. For example, a first entity may select privacy data to be completed and supplied by connecting user, whereas a second entity may not request privacy data in the initial stage, but rather environmental or non-discrimination employee policies to be completed by and supplied by the first entity, or other connecting user in the initial stage.

Figure 8C:

FIG. 8C shows a role user interface 810 for assigning individual users to a role tied to one or more questions and answers of the graduated dataset. For example, in the role user interface 810, the user "John Smith" is a compliance officer of a complex entity that is in the "Compliance" user group, and has ownership (approval authorization for a given stage) on "Compliance", which is a datatype that can be tagged in one or more of the stages, as discussed above with reference to FIGS. 4-6.

Figure 9A:
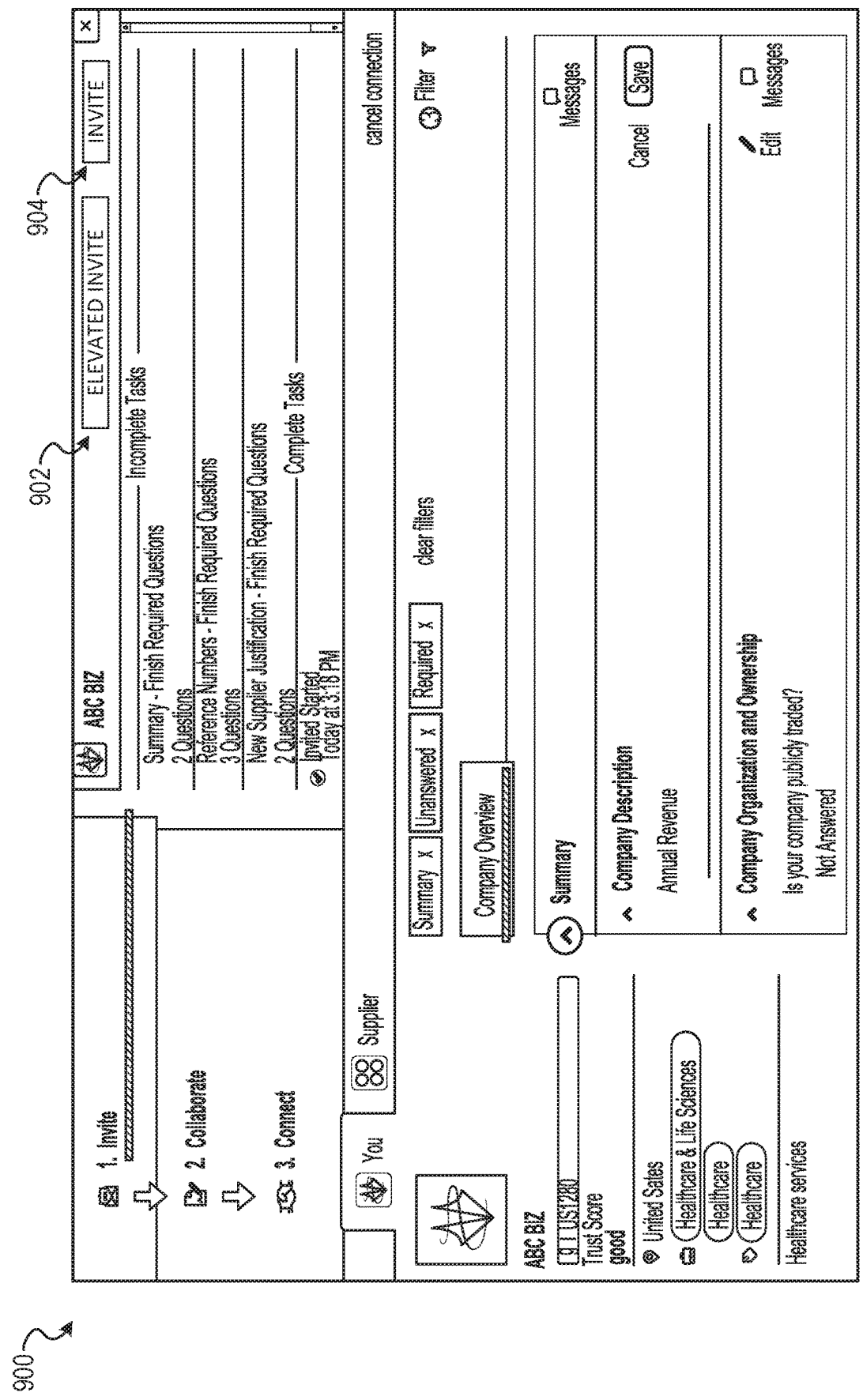

FIG. 9A shows an example initial stage user interface 900, according to some example embodiments. In the initial stage user interface 900, a logged in user (e.g., officer, salesperson) of an entity can initiate a compound connection process by selecting invite button 904 and selecting another potential entity (e.g., another company) from a search field. Upon sending the invite, the compound edge process is initiated, where portions of the graduate dataset are exposed in the sequential approval process. In some example embodiments, depending on the preconfigured role of the logged-in user (e.g., the user is a CEO or CFO of a company, logged in via secure username, password, or other security mechanisms), the elevated invite button 902 is included in initial stage user interface 900. Upon selecting the elevated invite button, the logged-in user can share the graduated dataset that would otherwise only be exposed in the initial or elevated stages. For example, if the user is a CFO, the user can send the elevated invite and include banking information in the invite sent to the potential connection. In some example embodiments, what information can be included in an elevated invite is limited to what information the logged-in user's role can access. For example, a non-officer of a company may not have access to banking or privacy data and cannot include such access in an elevated invite via initial stage user interface 900, whereas the privacy officer may include the entity's Data Privacy handbook in the elevated invite, since the user profile of the privacy officer has access and is authorized to access the handbook data.

FIG. 9B shows an example highlighted user interface 905 displaying potential connection data having highlights and an electronic session communication button ("Messages") to initiate communications for individual items, according to some example embodiments. For example, upon selecting the "Messages" session chat button, a communication window is created for transmission of questions to the officer or administrator of that stage's data type (e.g., creating a chat window directly with the compliance officer).

FIG. 9C shows an example custom question user interface 910 that displays a custom question field to be included in the graduated connection process, according to some example embodiments. In the illustrated example, the user has completed the products and services tab, completed the company keywords tab (e.g., keywords to trigger the company's profile as a search result), and is on the new supplier justification tab, which is an internal use part of the graduated data set. For example, after creating the connection, upon later review or audits, the data input to create the compound connection can be reviewed and audited along with the internally reviewed data, thereby keeping a record of the data used to create the connection where it is ensured that the data was input before or at the time the connection was created.

Figure 9D:
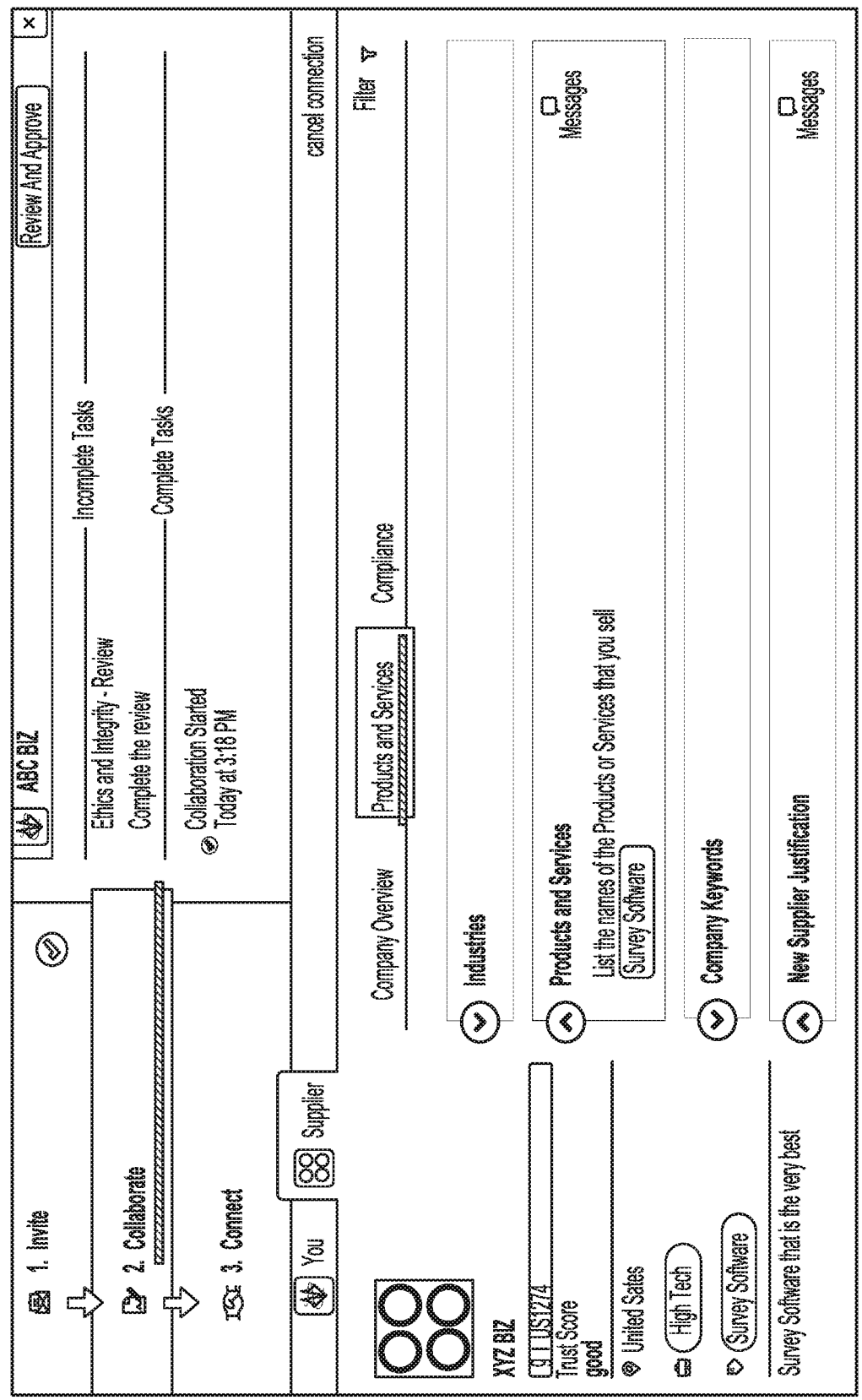

FIG. 9D shows an example elevated stage user interface 915, according to some example embodiments. In the example illustrated, the elevated stage user interface 915 includes an ethics and integrity tab and a timestamp indicating when the elevated "Collaborate" stage was imitated: e.g., "Today at 3:18 PM".

Figure 9E:
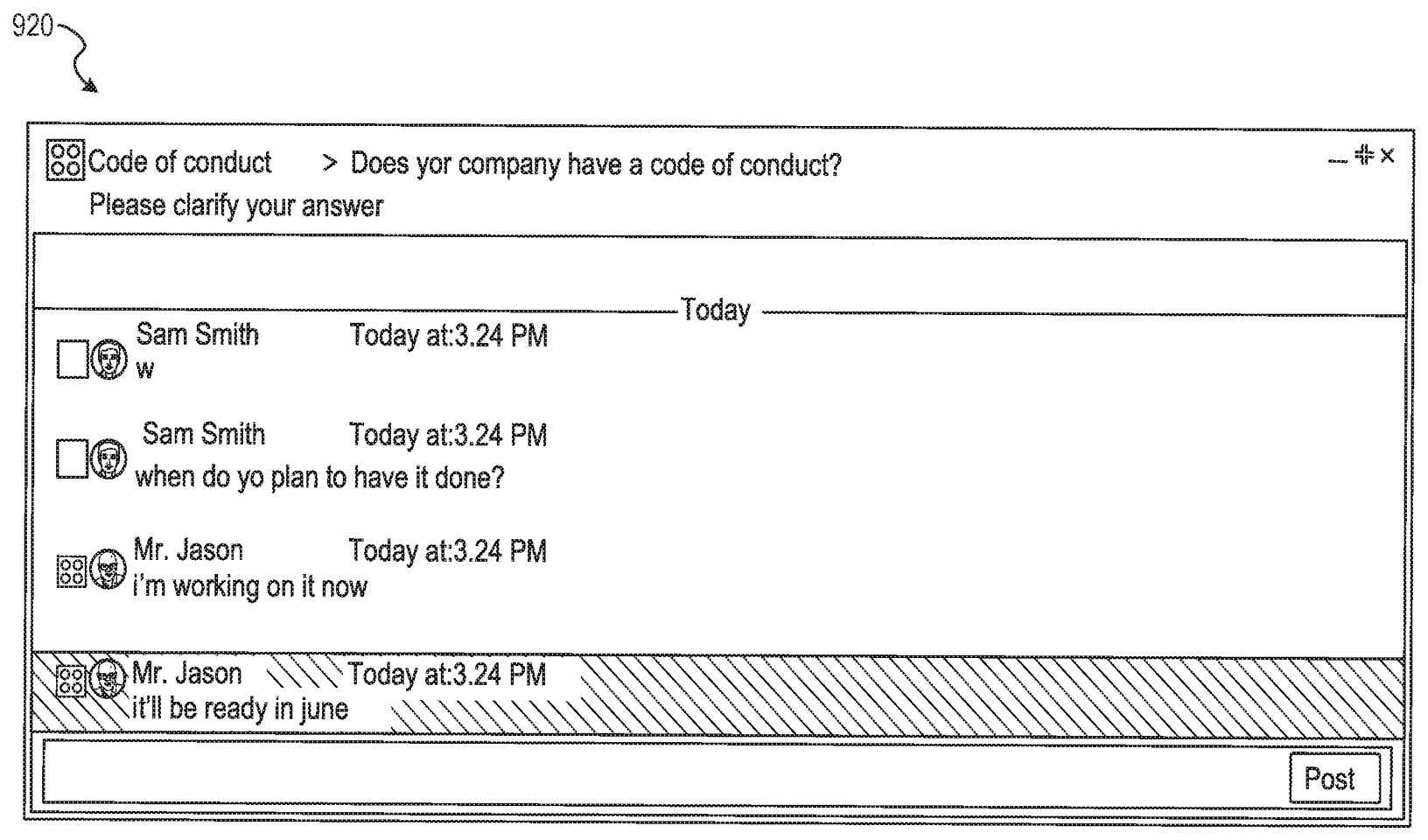
Figure 9F:
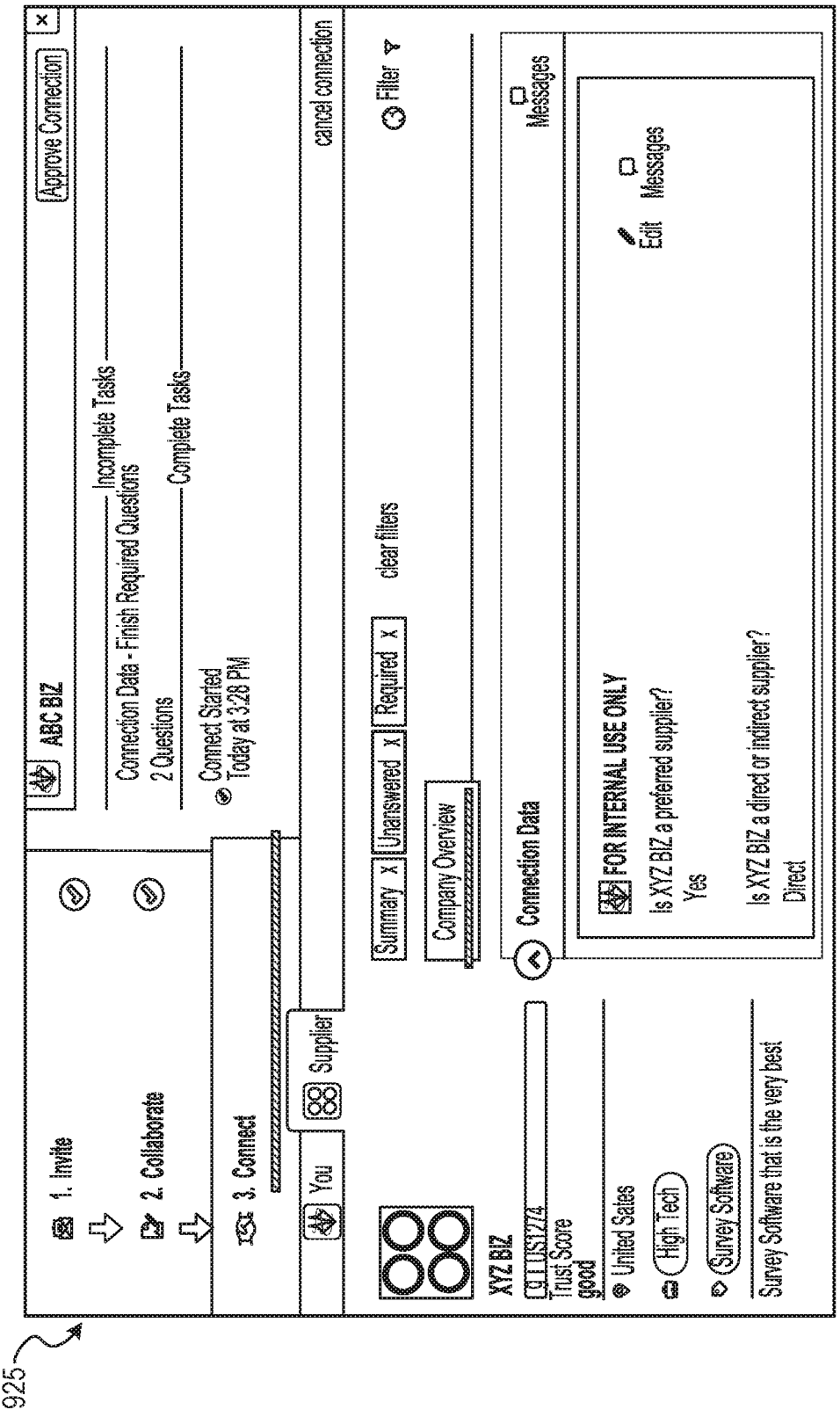

FIG. 9E shows an example chat session 920 launched in response to a user selecting the "Messages" button for an item in the elevated stage user interface of FIG. 9D. FIG. 9F shows an example trusted stage user interface 925, according to some example embodiments. In the illustrated example, the trusted "Connect" stage includes final questions, such as completing the final questions and analysis preconfigured for that stage.

Figure 10A:
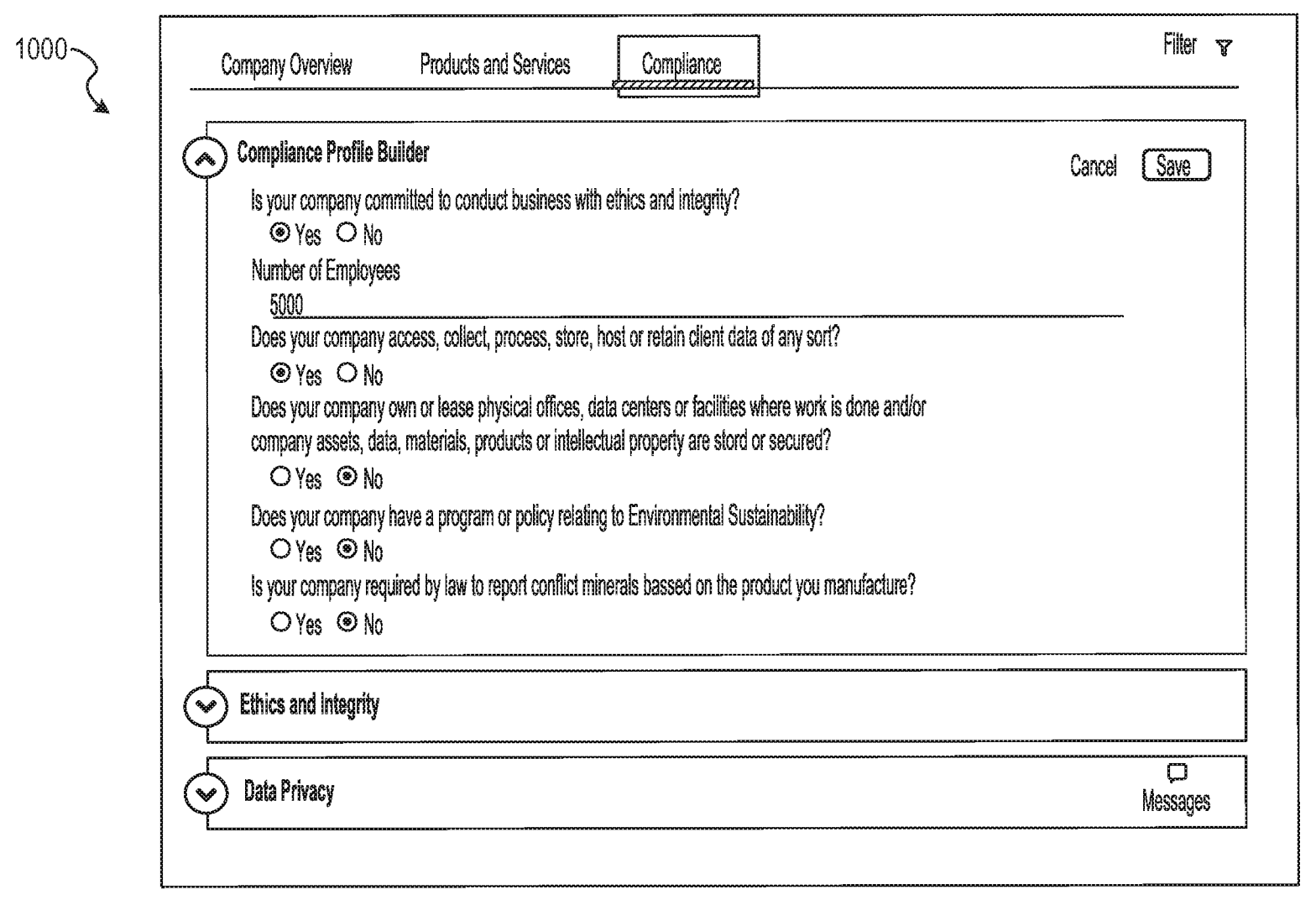

FIGS. 10A and 10B shows an example user interface 1000 performing an update to data of an organizational entity user, according to some example embodiments. In the illustrated example, the employee quantity is adjusted from 5000 to 1. In response to the update, the compound social network system 150 can generate a plurality of notifications to notify entity users that are already connected to the organizational entity user. Further, according to some example embodiments, one or more compound connections of the organizational entity are adjusted or terminated in response to the update, as discussed in further detail below.

Figure 11:
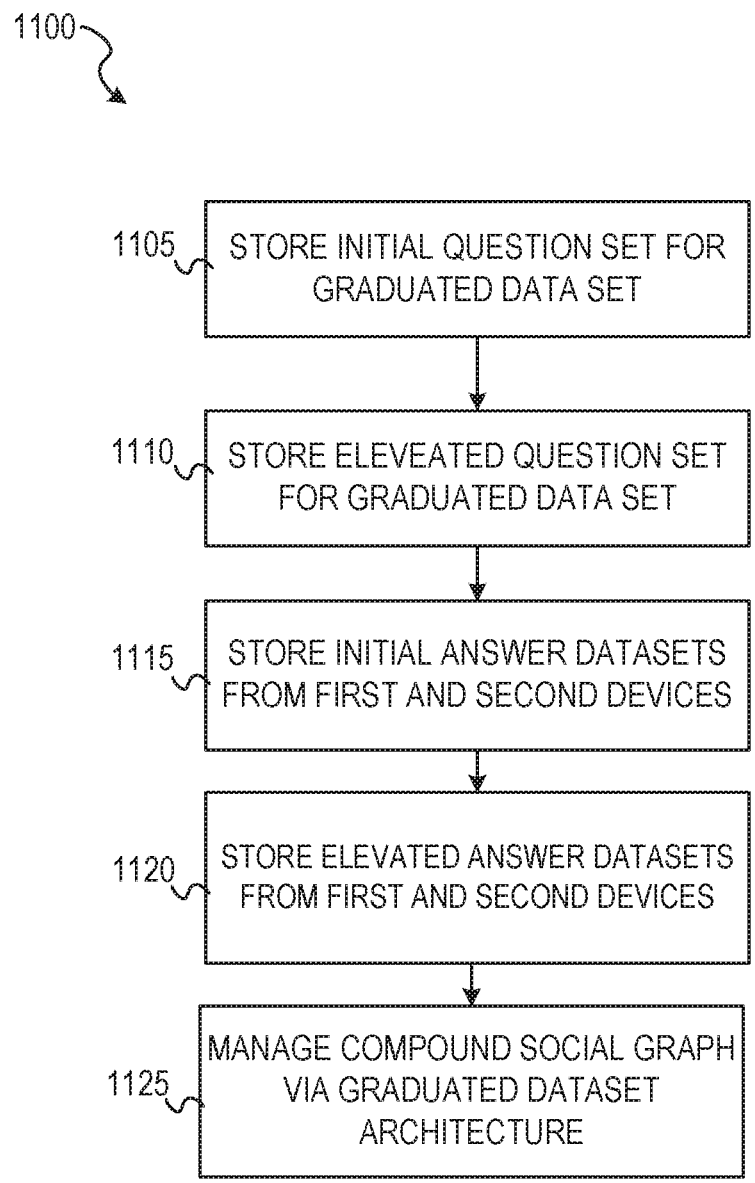
FIG. 11 shows an example flow diagram of a method for managing graduated data sets, according to some example embodiments.

FIG. 11 shows an example flow diagram of a method 1100 for managing graduated data sets, according to some example embodiments. At operation 1105, the compound social network system 150 stores initial question set data for the graduated dataset (e.g., stores questions for physical location data of user entities). At operation 1110, the compound social network system 150 stores an elevated question dataset for the graduated data set (e.g., stores questions for compliance data of user entities). At operation 1115, the compound social network system 150 receives initial answer datasets from the first and second devices (e.g., receives physical location data from a first user device and receives physical location data for a second user device). At operation 1120, the compound social network system 150 receives elevated answer datasets from the first and second client devices (e.g., receives banking account data from the first and second client devices). At operation 1125, the compound social network system 150 manages compound connections between client devices using the answer datasets and the graduated dataset architecture.

For instance, and in accordance with some example embodiments, after a compound connection is created between entities, whenever an entity user updates or changes any of their answers of the graduated dataset (e.g., changes an answer to an initial stage question, changes an answer to an elevated stage question), all entity users connected to the entity user are notified of the changes. In some example embodiments, the compound social network system 150 automatically performs actions in response to a user updating their answers based on which stage the modified data belongs to. For example, if a first user changes the number of employees from "5,000" employees to "5" employees, and if employee quantity data is initial stage data, the second user may be notified of the change (e.g., a certain individual of the second user entity, such as a Human Resources manager, may be notified of the change). Whereas if the first user changes data of an elevated or trusted stage (e.g., removing bank account information, changing tax status where bank and tax data belong to elevated or trusted stages), the compound social network system 150 may disconnect the two users on the compound social network graph database or may remove the first user's access to the second user's elevated stage data but maintain the compound connection between the two nodes in the compound social graph database. In some example embodiments, what type of response occurs can be managed via the structured data architecture 305 and be based on what level or type of field is modified. For example, in some implementations each node has discretion to set which fields will cause a notification, whereas more secure fields (e.g., banking data) can always trigger notifications and responsive actions such as disconnection.

Figure 12:
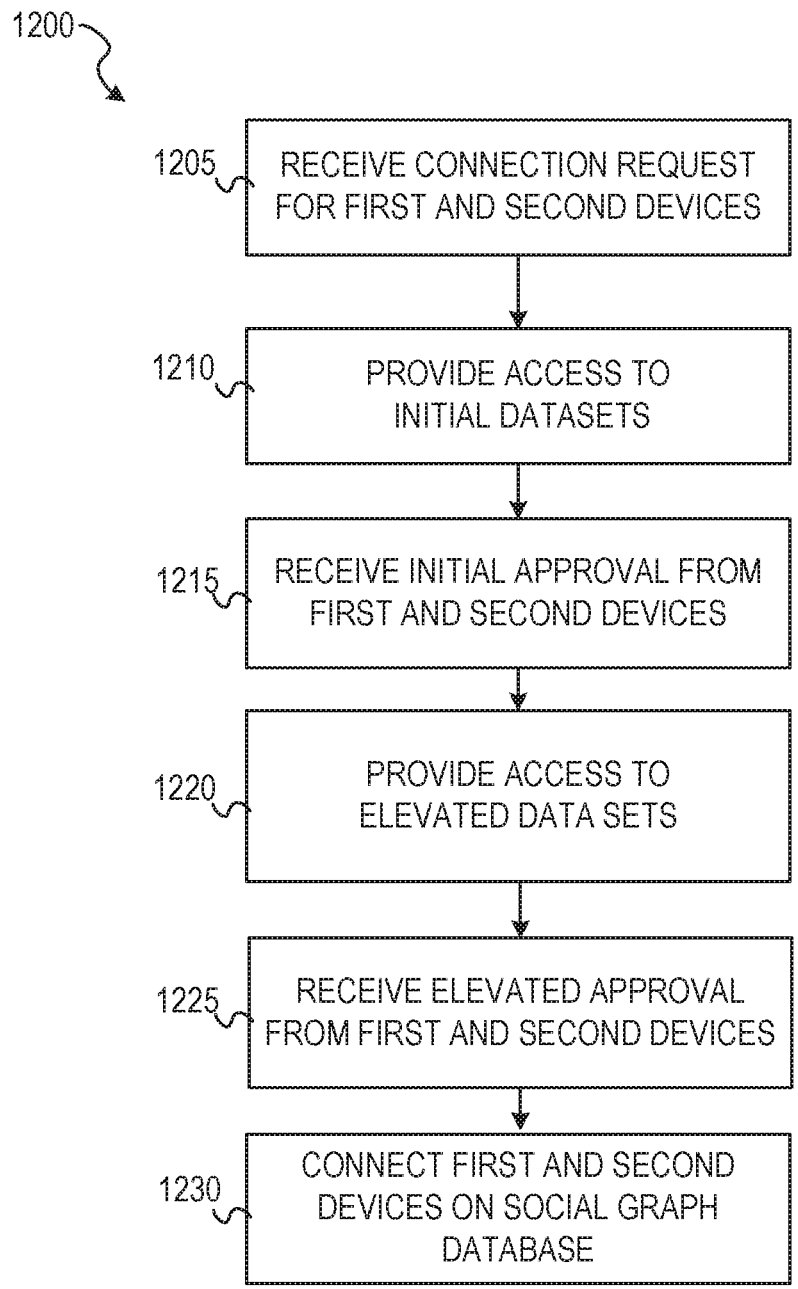
FIG. 12 shows an example flow diagram of a method for generating a compound connection between two user entities on a compound social graph database, according to some example embodiments.

FIG. 12 shows an example flow diagram of a method 1200 for generating a compound connection between two user entities on a compound social graph database, according to some example embodiments. At operation 1205, the compound social network system 150 receives a connection request for first and second client devices (e.g., receives, from a first client device, a connection invitation specifying a second client device). At operation 1210, the compound social network system 150 provides the first and second client devices access to each other's initial answer datasets in an initial stage.

At operation 1215, the compound social network system 150 receives approval from the first and second client devices to continue to the elevated stage. At operation 1220, the compound social network system 150 provides the first and second client devices access to each other's elevated answer datasets in an elevated stage. At operation 1225, the compound social network system 150 receives approval from the first and second client devices in the elevated stage. At operation 1230, based on received approval in the elevated stage, the compound social network system 150 generates a compound connection between the first and second client devices in a compound social graph database of a network platform. For example, the compound social network system 150 generates a compound connection between a first and second node in a compound social graph where the first and second nodes correspond to entity user accounts of the first and second client devices, as discussed above with reference to FIG. 2.

Figure 13:
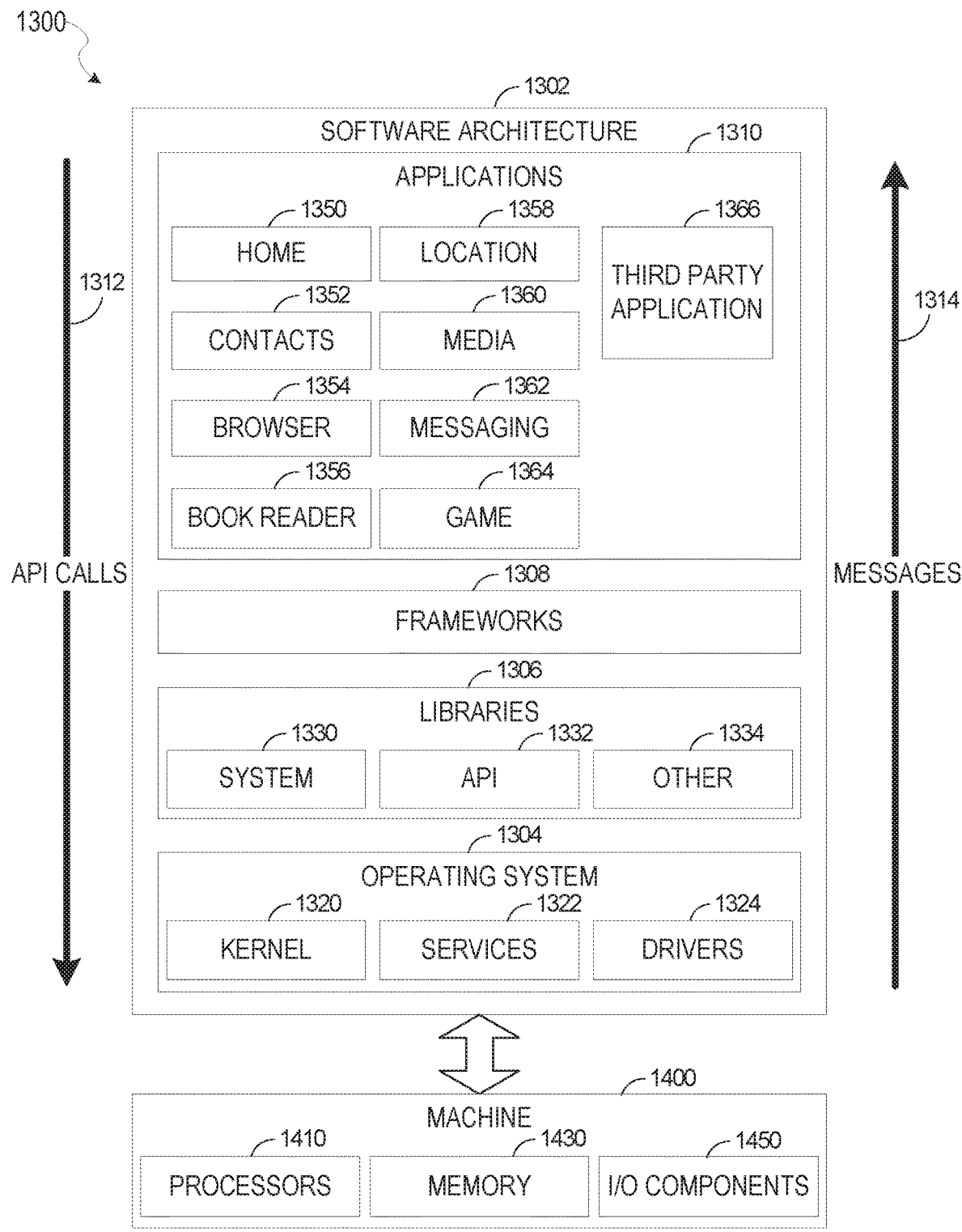
FIG. 13 is a block diagram illustrating an architecture of software for implementing the compound social network graph database system, according to some example embodiments.

FIG. 13 is a block diagram 1300 illustrating an architecture of software 1302, which can be installed on any one or more of the devices described above. FIG. 13 is merely a non-limiting example of a software architecture, and it will be appreciated that many other architectures can be implemented to facilitate the functionality described herein. In various embodiments, the software 1302 is implemented by hardware such as a machine 1400 of FIG. 14 that includes processors 1410, memory 1430, and I/O components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiment, the applications 1310 include a home application 1350, a contacts application 1352, a browser application 1354, a book reader application 1356, a location application. 1358, a media application 1360, a messaging application 1362, a game application 1364, and a broad assortment of other applications such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 1366 can invoke the API calls 1312 provided by the operating system 1304 to facilitate functionality described herein.

Figure 14:
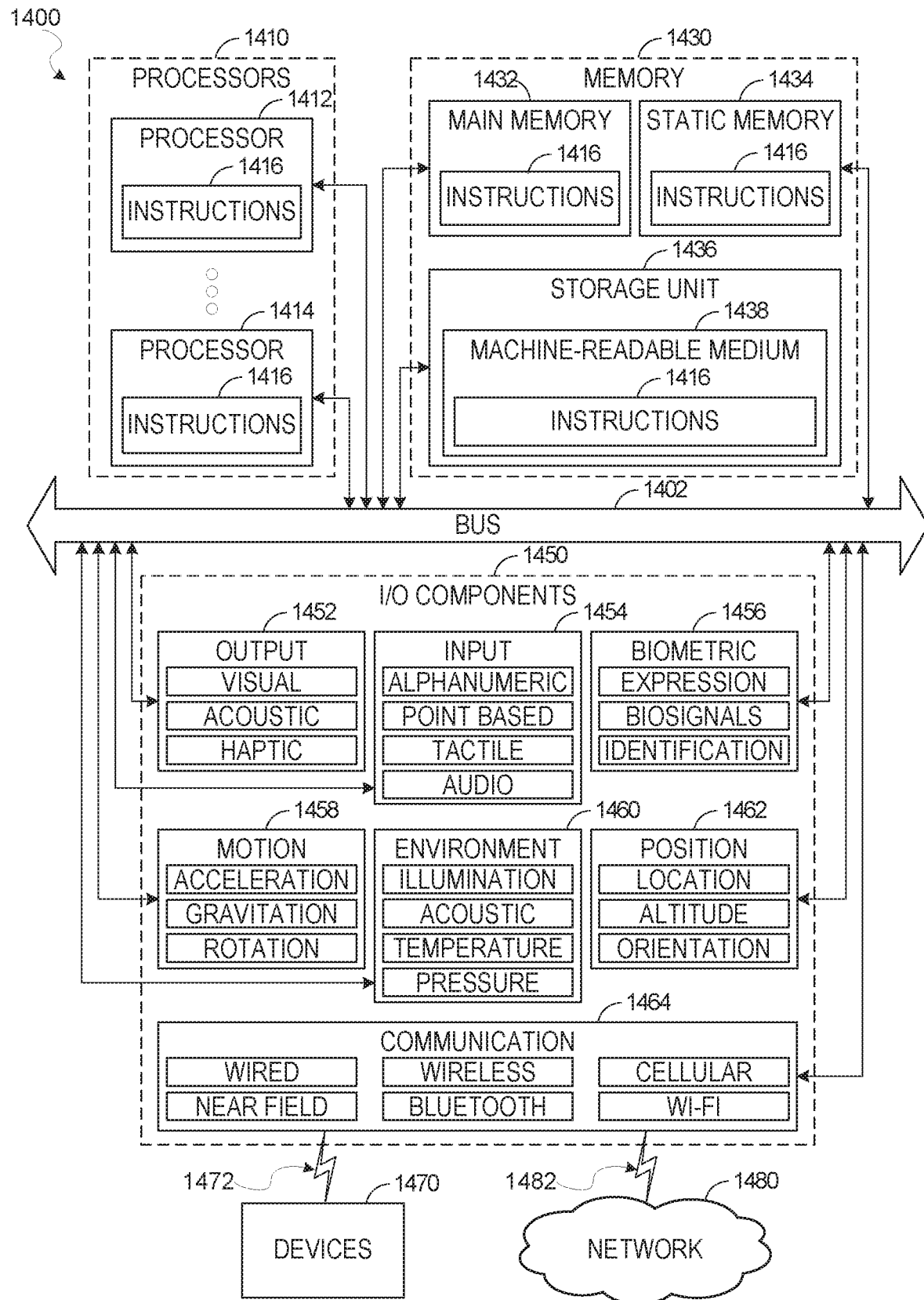
FIG. 14 illustrates a diagrammatic representation of a machine in the form of a computer system within which a set of instructions may be executed for causing the machine to perform any one or more of the methodologies discussed herein, according to an example embodiment.

FIG. 14 illustrates a diagrammatic representation of a machine 1400 in the form of a computer system within which a set of instructions may be executed for causing the machine to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the embodiments of FIGS. 2-12. The instructions 1416 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory 1430 may include a main memory 1432, a static memory 1434, and a storage unit 1436, both accessible to the processors 1410 such as via the bus 1402. The main memory 1430, the static memory 1434, and storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UTC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

The various memories (i.e., 1430, 1432, 1434, and/or memory of the processor(s) 1410) and/or storage unit 1436 may store one or more sets of instructions and data structures (e.g., software) embodying or utilized by any one or more of the methodologies or functions described herein. These instructions (e.g., the instructions 1416), when executed by processor(s) 1410, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UNITS), High Speed. Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol. (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform;
   receiving, from a first client device of the plurality of client devices, a request to create a compound connection in the compound social network graph database with a second client device using the sequentially exposed sets of data of the graduated datasets;
   causing, on the second client device, presentation of a first initial dataset uploaded by the first client device;
   causing, on the first client device, presentation of a second initial dataset uploaded by the second client device;
   receiving, from the first client device and the second client device, approvals of the first initial dataset and the second initial dataset;
   in response to receiving approvals of the first initial dataset and the second initial dataset, causing, on the second client device, presentation of a first elevated dataset uploaded by the first client device;
   in response to receiving approvals of the first initial dataset and the second initial dataset, causing, on the first client device, presentation of a second elevated dataset uploaded by the second client device;
   receiving, from the first client device and the second client device, approvals of the first elevated dataset and the second elevated dataset;
   in response to receiving the approvals of the first elevated dataset and the second elevated dataset, generating a compound connection in the compound social network graph database between a first node corresponding to the first client device and a second node corresponding the second client device;
   receiving changes to the first elevated dataset; and
   in response to the changes, automatically terminating the compound connection between the first node and the second node such that the second elevated dataset is no longer accessible to the first client device.

2. The method of claim 1, wherein each of the plurality of graduated datasets comprises a plurality of parameter fields, each parameter field having metadata assigning the parameter field to the initial dataset or the elevated dataset.

3. The method of claim 1, wherein each user specifies individual parameter fields to be answered in the initial dataset and the elevated dataset.

4. The method of claim 3, wherein the first elevated dataset of the first client device comprises question parameter fields specified by the second client device and answered by the first client device.

5. The method of claim 4, wherein the second elevated dataset of the second client device comprises question parameter fields specified by the first client device and answered by the second client device.

6. The method of claim 1, wherein the compound social graph database includes compound connections created by different graduated datasets comprising different answers in the initial dataset and different answers in the elevated dataset.

7. The method of claim 1, wherein each of the nodes are organization nodes having multiple user accounts, wherein the first node is a first organization node having a first set of user accounts and the second node is a second organization node comprising a second set of user accounts.

8. The method of claim 7, wherein the first client device corresponds to one of the first set of user accounts and the second client device corresponds to one of the second set of user accounts.

9. The method of claim 7, wherein each of the multiple user accounts includes preconfigured authorization to connect to other organization nodes managed by the network platform.

10. The method of claim 7, wherein each of the multiple user accounts has an assigned role within a corresponding organization of an organization node.

11. The method of claim 10, wherein the elevated dataset is only approvable by one or more pre-configured assigned roles.

12. A system comprising:
one or more processors of a machine; and
a memory storing instructions that, when executed by the one or more processors, cause the machine to perform operations comprising:
receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform;
receiving, from a first client device of the plurality of client devices, a request to create a compound connection in the compound social network graph database with a second client device using the sequentially exposed sets of data of the graduated datasets;
causing, on the second client device, presentation of a first initial dataset uploaded by the first client device;
causing, on the first client device, presentation of a second initial dataset uploaded by the second client device;
receiving, from the first client device and the second client device, approvals of the first initial dataset and the second initial dataset;
in response to receiving approvals of the first initial dataset and the second initial dataset, causing, on the second client device, presentation of a first elevated dataset uploaded by the first client device;
in response to receiving approvals of the first initial dataset and the second initial dataset, causing, on the first client device, presentation of a second elevated dataset uploaded by the second client device;
receiving, from the first client device and the second client device, approvals of the first elevated dataset and the second elevated dataset;
in response to receiving the approvals of the first elevated dataset and the second elevated dataset, generating a compound connection in the compound social network graph database between a first node corresponding to the first client device and a second node corresponding the second client device;
receiving changes to the first elevated dataset, and
in response to the changes, automatically terminating the compound connection between the first node and the second node such that the second elevated dataset is no longer accessible to the first client device.

13. The system of claim 12, wherein each of the plurality of graduated datasets comprises a plurality of parameter fields, each parameter field having metadata assigning the parameter field to the initial dataset or the elevated dataset.

14. The system of claim 12, wherein each user specifies individual parameter fields to be answered in the initial dataset and the elevated dataset.

15. The system of claim 14, wherein the first elevated dataset of the first client device comprises question parameter fields specified by the second client device and answered by the first client device.

16. A machine storage medium embodying instructions that, when executed by a machine, cause the machine to perform operations comprising:
receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform;
receiving, from a first client device of the plurality of client devices, a request to create a compound connection in the compound social network graph database with a second client device using the sequentially exposed sets of data of the graduated datasets;
causing, on the second client device, presentation of a first initial dataset uploaded by the first client device;
causing, on the first client device, presentation of a second initial dataset uploaded by the second client device;
receiving, from the first client device and the second client device, approvals of the first initial dataset and the second initial dataset;
in response to receiving approvals of the first initial dataset and the second initial dataset, causing, on the second client device, presentation of a first elevated dataset uploaded by the first client device;
in response to receiving approvals of the first initial dataset and the second initial dataset, causing, on the first client device, presentation of a second elevated dataset uploaded by the second client device;
receiving, from the first client device and the second client device, approvals of the first elevated dataset and the second elevated dataset;
in response to receiving the approvals of the first elevated dataset and the second elevated dataset, generating a compound connection in the compound social network graph database between a first node corresponding to the first client device and a second node corresponding the second client device;
receiving changes to the first elevated dataset; and
in response to the changes, automatically terminating the compound connection between the first node and the second node such that the second elevated dataset is no longer accessible to the first client device.

17. A method comprising:
receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device, the first elevated dataset including question parameter fields specified by the second client device and answered by the first client device;

in response to receiving approvals of the first initial dataset and the second initial dataset, causing, on the first client device, presentation of a second elevated dataset uploaded by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

18. A system comprising:
one or more processors of a machine; and
a memory storing instructions that, when executed by the one or more processors, cause the machine to perform operations comprising:

receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device, the first elevated dataset including question parameter fields specified by the second client device and answered by the first client device;

in response to receiving approvals of the first initial dataset and the second initial dataset, causing, on the first client device, presentation of a second elevated dataset uploaded by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

19. A machine storage medium embodying instructions that, when executed by a machine, cause the machine to perform operations comprising:

receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device, the first elevated dataset including question parameter fields specified by the second client device and answered by the first client device;

in response to receiving approvals of the first initial dataset and the second initial dataset, causing, on the first client device, presentation of a second elevated dataset uploaded by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

20. A method comprising:

receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device;

in response to receiving approvals of the first initial dataset and the second initial dataset, causing, on the first client device, presentation of a second elevated dataset uploaded by the second client device, the second elevated dataset including question parameter fields specified by the first client device and answered by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

21. A system comprising:

one or more processors of a machine; and a memory storing instructions that, when executed by the one or more processors, cause the machine to perform operations comprising:

receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device;

in response to receiving approvals of the first initial dataset and the second initial dataset, causing, on the first client device, presentation of a second elevated dataset uploaded by the second client device, the second elevated dataset including question parameter fields specified by the first client device and answered by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

22. A machine storage medium embodying instructions that, when executed by a machine, cause the machine to perform operations comprising:

receiving, by a network platform, a plurality of graduated datasets uploaded by a plurality of client devices corresponding to nodes in a compound social network graph database managed by the network platform, the graduated datasets comprising sequentially exposed sets of data including an initial dataset and an elevated dataset, connections between nodes in the compound social network graph database being created upon exposing and approval of initial datasets uploaded by potential connecting users followed by exposing and approval of elevated datasets uploaded by the potential connecting users, the elevated dataset not being exposed until approval for the initial dataset is received by the network platform, each potential connecting user specifying individual parameter fields to be answered in the initial dataset and the elevated dataset;

receiving, from a first client device of the plurality of client devices, a request to create a compound connection in the compound social network graph database with a second client device using the sequentially exposed sets of data of the graduated datasets;

causing, on the second client device, presentation of a first initial dataset uploaded by the first client device;

causing, on the first client device, presentation of a second initial dataset uploaded by the second client device;

receiving, from the first client device and the second client device, approvals of the first initial dataset and the second initial dataset;

in response to receiving approvals of the first initial dataset and the second initial dataset, causing, on the second client device, presentation of a first elevated dataset uploaded by the first client device;

in response to receiving approvals of the first initial dataset and the second initial dataset, causing, on the first client device, presentation of a second elevated dataset uploaded by the second client device, the second elevated dataset including question parameter fields specified by the first client device and answered by the second client device;

receiving, from the first client device and the second client device, approvals of the first elevated dataset and the second elevated dataset; and in response to receiving the approvals of the first elevated dataset and the second elevated dataset, generating a compound connection in the compound social network graph database between a first node corresponding to the first client device and a second node corresponding the second client device.

* * * * *

UNITED STATES PATENT AND TRADEMARK OFFICE
CERTIFICATE OF CORRECTION

PATENT NO. : 11,562,442 B2
APPLICATION NO. : 16/803325
DATED : January 24, 2023
INVENTOR(S) : Smith et al.

Page 1 of 2

It is certified that error appears in the above-identified patent and that said Letters Patent is hereby corrected as shown below:

In the Specification

In Column 4, Line 1, delete "interoperability" and insert --Interoperability-- therefor In Column 6, Line 22, delete "fields;" and insert --fields,-- therefor In Column 6, Line 29, delete "Union." and insert --Union-- therefor In Column 8, Line 52, after "10", insert --million--

In Column 9, Line 14, delete "stage;" and insert --stage,-- therefor

In Column 14, Line 7, delete "application." and insert --application-- therefor

In Column 14, Line 22, after "ANDROID™", insert --,--

In Column 16, Line 21, delete "(UTC)" and insert --(UPC)-- therefor

In Column 17, Line 13, delete "third." and insert --third-- therefor

In Column 17, Line 16, delete "(UNITS)," and insert --(UMTS),-- therefor

In Column 17, Line 26, delete "protocol." and insert --protocol-- therefor

In the Claims

In Column 18, Line 29, in Claim 1, before "the", insert --to--

In Column 19, Line 55, in Claim 12, before "the", insert --to--

Signed and Sealed this
Twenty-third Day of May, 2023

Katherine Kelly Vidal
*Director of the United States Patent and Trademark Office*

CERTIFICATE OF CORRECTION (continued)
U.S. Pat. No. 11,562,442 B2

In Column 19, Line 56, in Claim 12, delete "dataset," and insert --dataset;-- therefor In Column 20, Line 50, in Claim 16, before "the", insert --to--

In Column 21, Line 37, in Claim 17, before "the", insert --to--

In Column 22, Line 24, in Claim 18, before "the", insert --to--

In Column 23, Line 9, in Claim 19, before "the", insert --to--

In Column 23, Line 58, in Claim 20, before "the", insert --to--

In Column 24, Line 45, in Claim 21, before "the", insert --to--

In Column 25, Line 29, in Claim 22, before "the", insert --to--